(12) United States Patent
Bassani et al.

(10) Patent No.: US 8,024,564 B2
(45) Date of Patent: Sep. 20, 2011

(54) AUTOMATING CONFIGURATION OF SOFTWARE APPLICATIONS

(75) Inventors: Manuela Bassani, Rome (IT); Gaetano Ferrari, Rome (IT); Claudio Morgia, Rome (IT); Marco Secchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 11/949,210

(22) Filed: Dec. 3, 2007

(65) Prior Publication Data
US 2008/0250493 A1 Oct. 9, 2008

(30) Foreign Application Priority Data

Dec. 6, 2006 (EP) ..................................... 06125520

(51) Int. Cl.
*G06F 17/00* (2006.01)
*G06F 9/44* (2006.01)
(52) U.S. Cl. .............................. 713/164; 726/1; 717/127
(58) Field of Classification Search .................... 726/22, 726/1, 2, 16, 17, 21; 713/164, 166; 717/127, 717/118; 719/318
See application file for complete search history.

(56) References Cited

U.S. PATENT DOCUMENTS

| 6,526,513 | B1 | 2/2003 | Shrader et al. | |
| 2002/0184486 | A1* | 12/2002 | Kershenbaum et al. | ...... 713/150 |
| 2004/0243881 | A1* | 12/2004 | Wang et al. | ...................... 714/37 |

* cited by examiner

*Primary Examiner* — Edward Zee
(74) *Attorney, Agent, or Firm* — Stephen J. Walder, Jr.; Jeffrey S. LaBaw (57) ABSTRACT

A solution is proposed for populating a policy file in a Java environment automatically. For this purpose, there is provided a wrapper for a security manager in charge of controlling any access to protected resources. A generic Java application is run in a test environment. Whenever a specific operation must be executed on a secured resource, the Java application submits a corresponding permission request to the wrapper. The wrapper forwards the permission request to the security manager, which verifies whether the required permission is available in the policy file. The wrapper logs any denied permission. In any case, the wrapper always grants the required permission to the Java application, so that its operation can continue without any problem. At the end of the running of the Java application, the logged missing permissions are added to the policy file.

23 Claims, 5 Drawing Sheets

AUTOMATING CONFIGURATION OF SOFTWARE APPLICATIONS

FIELD OF THE INVENTION

The present invention relates to the information technology field. More specifically, the invention relates to the configuration of software applications.

BACKGROUND ART

The configuration of software applications is a very complex task. A typical scenario is the definition of the security requirements for the correct operation of the software applications.

For example, the software applications may be written in the Java language. Java applications run in a Java Virtual Machine (JVM), which consists of an abstract computing machine providing a runtime environment independent of the underlying (hardware and software) platform. This allows running the Java applications virtually on any type of computers (provided that the required JVM is available). For this reason, the Java applications have found extensive use in the Internet. Whenever a Java application must execute a specific operation on a secured resource (for example, reading or writing a file), a corresponding permission must be granted for that operation. In the Java environment, all the available permissions are defined in a so-called policy file (or more). Therefore, when a new Java application (or a new version thereof) is deployed it is necessary to ensure that the permissions required for its correct operation are defined in the policy file.

However, the composition of the policy file is decidedly not trivial. Indeed, for this purpose an operator must add a specific entry to the policy file for each required permission (according to the corresponding syntax).

Some graphical tools (such as the "policytool" shipped with the JSDK) are available to facilitate the task of editing the policy file—without the need of knowing its syntax.

In any case, this task remains substantially manual (and then strongly dependent on the skill of the operator and prone to errors).

Moreover, it is very difficult (if not impossible) to identify all the permissions required by the Java application a priori. Therefore, it may happen that some permissions are missing; in this case, when an operation requiring a missing permission is invoked at run-time a corresponding exception is thrown. Typically, this exception reaches a bottom of an execution stack (since it cannot be managed within the Java application itself), thereby causing a malfunctioning in the whole Java application. The operator must then stop the Java application, add the missing permission to the policy file, and then restart the Java application.

However, the above-described "trial and error" approach is very time consuming. Moreover, this has a deleterious effect on the reliability of the Java application.

U.S. Pat. No. 6,526,513 discloses a solution for managing the permissions dynamically. In this case, when a Java application requires a permission that is not defined in the policy file, a user is prompted to grant or deny the required permission at run-time; the granted or denied permissions may also be saved so as to take effect across different sessions. The cited document further introduces the concept of denied permissions in the policy file, so as to allow granting permissions to large collections of secured resources with the exception of a few of them.

However, the proposed technique requires the definition of a custom security manager (in place of the standard one that is used to manage the permissions in the Java environment). In any case, the problem of defining the bulk of the permissions statically in the policy file remains unresolved (with the same drawbacks pointed out above).

SUMMARY OF THE INVENTION

In its general terms, the present invention is based on the idea of automating the configuration of the software applications. Particularly, the present invention provides a solution as set out in the independent claims. Advantageous embodiments of the invention are described in the dependent claims.

More specifically, an aspect of the invention provides a method for configuring a software application. In one illustrative embodiment, the method starts with the step of running the software application on a data processing system. A plurality of operations of the software application are invoked with the execution of each operation utilizing a configuration feature of the software application. The method continues by verifying an availability of the configuration feature for each operation. An indication of each non-available configuration feature is logged. At approximately the same time, the availability of each non-available configuration feature is simulated, so as to enable the execution of the corresponding operation. Each operation is then executed. At the end, the software application is configured according to the logged non-available configuration features.

A further aspect of the invention proposes a computer program for performing the above-described method. Another aspect of the invention proposes a corresponding system.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
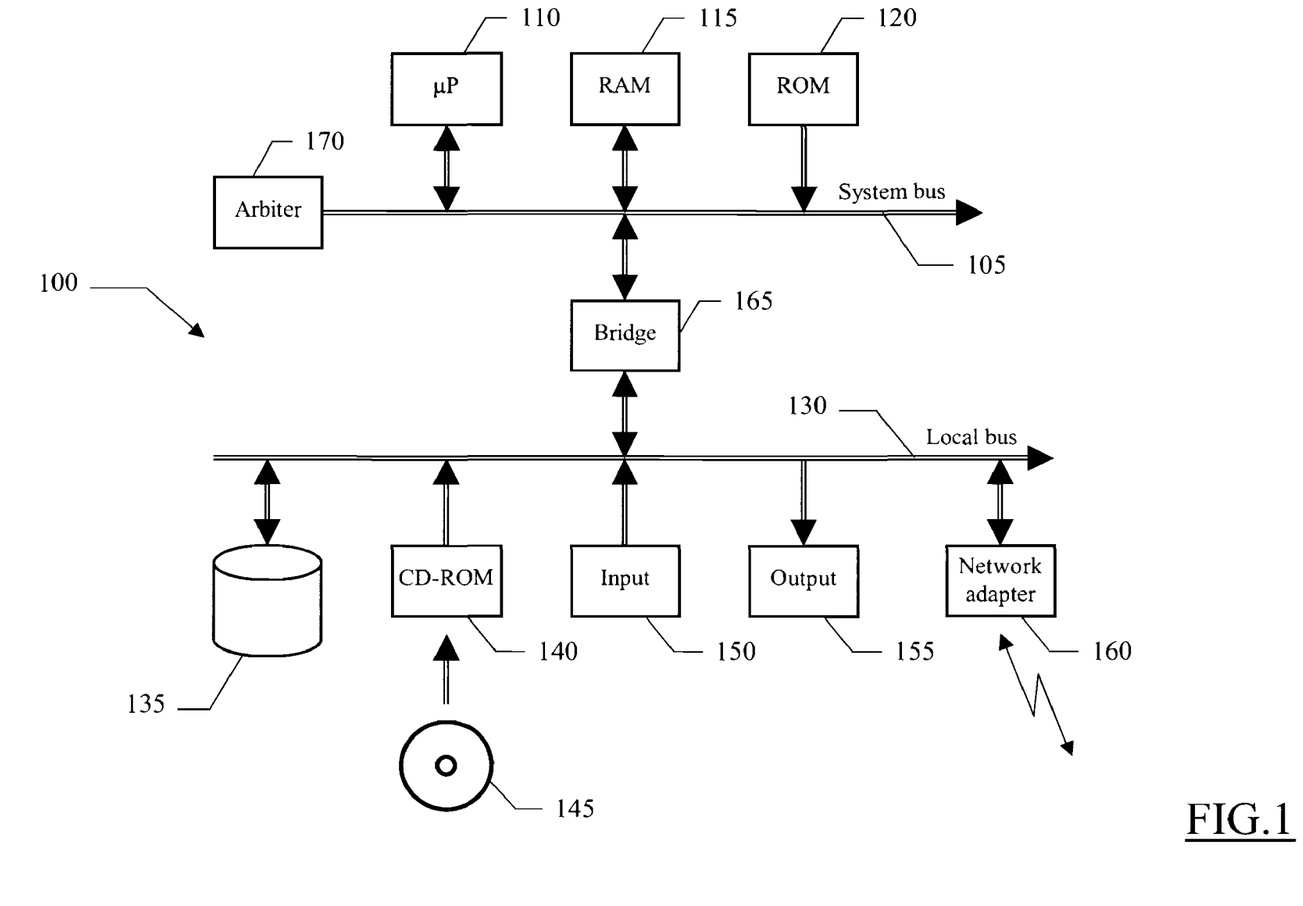
FIG. 1 is a schematic block diagram of a data processing system in which the solution according to an embodiment of the invention is applicable.

With reference in particular to FIG. 1, a computer 100 is illustrated. For example, the computer 100 consists of a server in the Internet. The server 100 provides shared resources for clients that access them through a telecommunication network (not shown in the figure); for example, the server 100 runs one or more web applications (such as written in the Java language).

More specifically, the server 100 is formed by several units that are connected in parallel to a system bus 105. In detail, multiple microprocessors (/P) 110 control operation of the server 100; a RAM 115 is directly used as a working memory by the microprocessors 110, and a ROM 120 stores basic code for a bootstrap of the server 100. Several peripheral units are clustered around a local bus 130 (by means of respective interfaces). Particularly, a mass memory consists of a bank of hard-disks 135 and drives 140 for reading CD-ROMs 145. Moreover, the server 100 includes input units 150 (for example, a keyboard and a mouse), and output units 155 (for example, a monitor and a printer). A network adapter 160 is used to plug the server 100 into the Internet. A bridge unit 165 interfaces the system bus 105 with the local bus 120. Each microprocessor 110 and the bridge unit 165 can operate as master agents requesting an access to the system bus 105 for transmitting information. An arbiter 170 manages the granting of the access with mutual exclusion to the system bus 105.

Figure 2A:
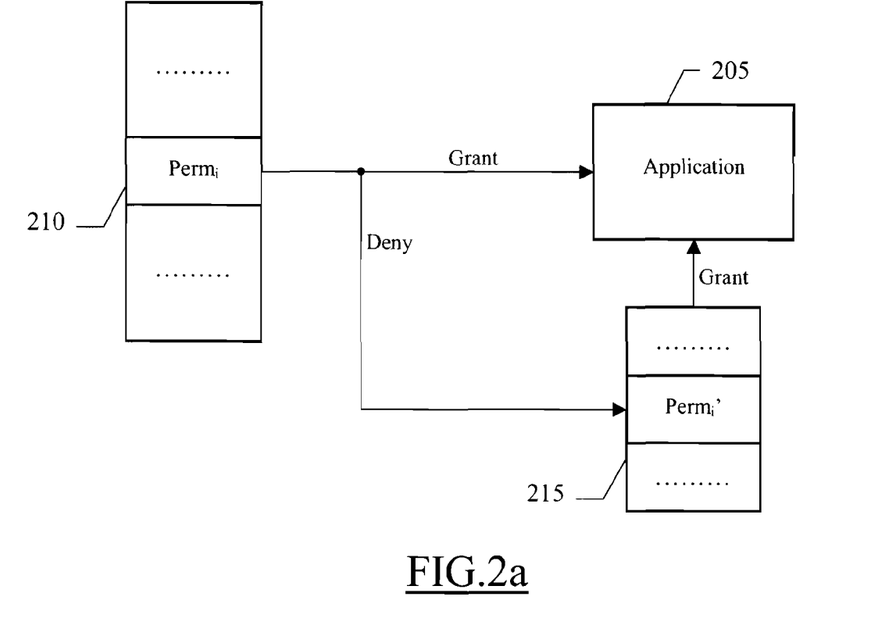
FIGS. 2a-2b illustrate an exemplary application of the solution according to an embodiment of the invention.

Considering now FIG. 2a, the above-described server must run a generic software application 205 (consisting of a Java application in the example at issue). The application 205 may require the execution of operations on secured resources, such as reading or writing a file, opening a socket, and the like (as defined by the invocation of corresponding Java APIs in the example at issue). For this purpose, a permission for that operation must be granted to the application 205.

The available permissions for all the secured resources (generically denoted with $Perm_i$) are stored in a security structure 210 (consisting of a policy file in the case of the Java application); the security structure 210 must be predefined with all the permissions required by the application 205 to allow its correct operation.

In the solution according to an embodiment of the present invention, as described in detail in the following, the security structure 205 is populated automatically by running the application 205 (for example, in a test environment).

Briefly, whenever the application 205 needs to execute a specific operation on a secured resource, the corresponding permission is required. If the required permission is available in the security structure 210, this permission is granted to the application 205 as usual. Conversely, the missing permission is added to an output structure 215 (such as a log file); anyway, the required permission is granted to the application 205 (simulating its availability in the security structure 210). Therefore, at the end of the running of the application 205 the output structure 210 will include all the missing permissions (generically denoted with $Perm_i'$), which were required by the application 205 but that were not available in the security structure 210.

Figure 2B:
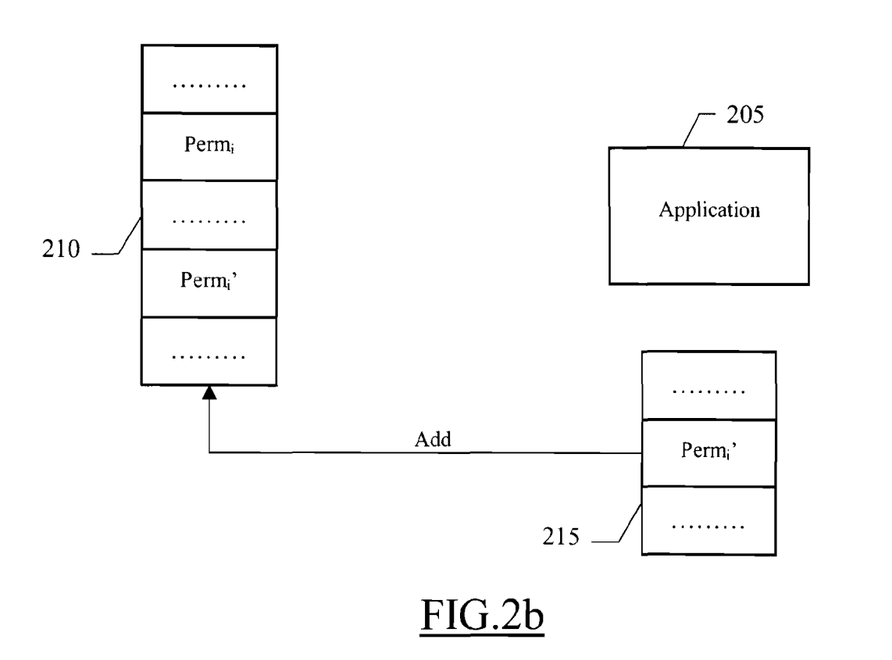

Moving to FIG. 2b, the missing permissions $Perm_i'$ in the output structure 215 are added to the security structure 210. In this way, the security structure 210 includes all the permissions that were required by the application 205. Therefore, assuming that all the operations of the application 205 accessing secured resources were invoked, the security structure 210 now includes all the permissions required for the correct operation of the application 205 (or at least most of them). The application 205 with the security structure 210 so obtained can now be deployed to a production environment for its actual use.

The proposed solution strongly facilitates the definition of the security structure 210.

Particularly, the task of populating the security structure 210 is now (at least in part) automated; therefore, the obtained results are substantially independent of the skill of any operator, and then less prone to errors.

In this way, it is possible to ensure that the security structure 210 includes all the permissions required by the application 205 (or at least most of them). This strongly limits the malfunctioning of the application 205 at run-time (due to missing permissions), and then the interventions of the operator to fix the problems.

All of the above significantly reduces the length of the whole process of configuring the application 205 (with the required security structure 210) for its correct operation; moreover, this has a beneficial impact on the reliability of the application 205.

Figure 3:
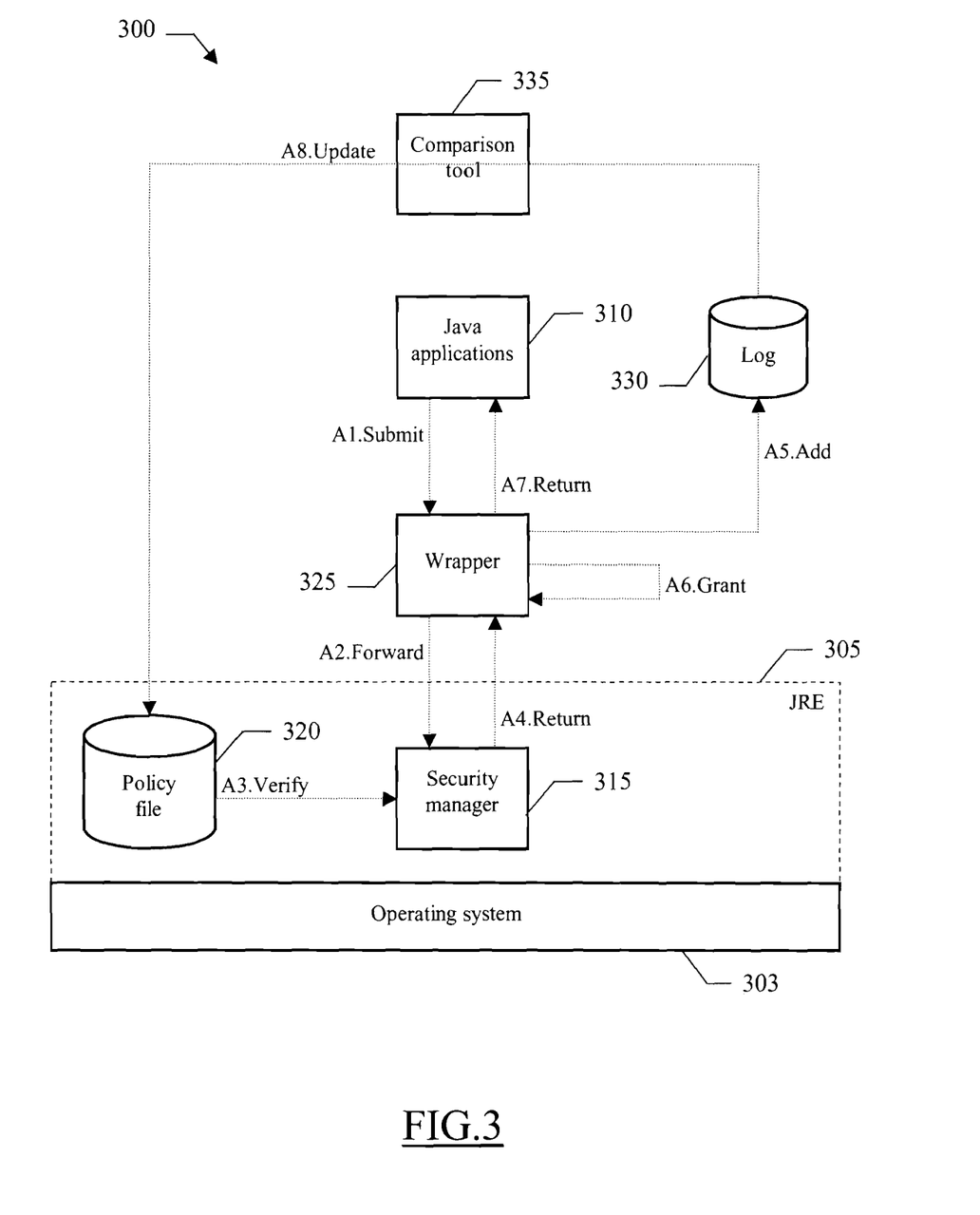
FIG. 3 is a collaboration diagram representing the roles of the different components implementing the solution according to an embodiment of the invention.

With reference now to FIG. 3, the main software components that run on the server are denoted as a whole with the reference 300. The information (programs and data) is typically stored on the hard-disks and loaded (at least partially) into the working memory of the server when the programs are running. The programs are initially installed onto the hard-disks, for example, from CD-ROMs. Particularly, the figure describes the static structure of the system (by means of the corresponding modules) and its dynamic behavior (by means of a series of exchanged messages, each one representing a corresponding action denoted with sequence numbers preceded by the symbol "A").

Particularly, an operating system 303 (such as Linux) provides a software platform for the server, on top of which other programs can run. Particularly, a Java Runtime Environment (JRE) 305 is installed over the operating system 303. The JRE 305 defines a standard platform for running Java applications 310.

The JRE 305 includes different modules—such as a JVM, Java core classes and supporting files (not shown in the figure); with reference more specifically to the modules relevant to the described embodiment of the present invention, the JRE 305 includes a security manager 315 that is in charge of controlling any access to the protected resources of the server; particularly, the security manager 315 receives all the requests for the permissions—required for executing operations on secured resources—from the Java applications 310 and returns corresponding results (i.e., granting or denying the permissions). For this purpose, the security manager 315 loads the content of a policy file 320 (or more). By default, the JRE 305 includes a single system-wide policy file; optionally, a user policy file may also be added or specified dynamically.

The policy file 320 statically defines all the permissions that are available for executing specific operations on the secured resources. In this way, every operation (accessing a secured resource) can be executed only if a corresponding permission for that operation is available in the policy file 320; the only exception is that each Java application 310 is always automatically authorized to read files from the same location of the Java application 310 (i.e., its URL), without the need of any explicit permission.

The policy file 320 may include a keystore entry and any number of grant entries. The keystore entry (beginning with the keyword "Keystore") is used to specify a database of private keys and associated digital certificates authenticating the corresponding public keys, which is used to validate signers of the grant entries; the database is defined by its location (i.e., URL) and its type (such as "JKS"). Each grant entry (beginning with the keyword "grant") instead indicates a set of operations on protected resources that are authorized to specific Java applications, as identified by their code source (represented by an object of the class "CodeSource"). The code source is specified in the grant entry by a location of the Java application ("codeBase" name/value pair) and/or by its signer ("signedBy" name/value pair); particularly, the signer is identified by an alias (or more) for a certificate stored in the database of the keystore entry (meaning that a JAR file of the Java application must have been signed with the private key corresponding to the public key in this certificate). As a result, it is possible to grant permissions to Java applications coming from specific locations and/or signed by a specific signer (with the permissions that are granted to everyone when both of them are not specified). The grant entry then includes one or more permission entries (enclosed between "{" and "}"). Each permission entry (beginning with the keyword "permission") specifies the specific operation that is authorized. For this purpose, the permission entry indicates the type of operation by means of a permission class (such as an I/O operation), the possible action for that operation (such as read), and optionally the signer of the permission class itself ("signedBy" name/value pair).

In the solution according to an embodiment of the invention, a wrapper 325 for the security manager 315 is added (in the test environment). The wrapper 325 shields the security manager 315 from the outside, thereby acting as an interface between the security manager 315 and the Java applications 310. In this specific context, the wrapper 325 exposes the same interface as the security manager 315 (so that its presence is completely opaque to the Java applications 310); therefore, the wrapper 325 receives all the permission requests from the Java applications 310 and returns the corresponding results (in place of the security manager 315).

The wrapper 325 is used to populate the policy file 320 for a generic Java application 310 automatically. For this purpose, the Java application 310 is run; whenever a specific operation must be executed on a secured resource, the Java application 310 submits a corresponding permission request to the wrapper 325 (action "A1.Submit"). The wrapper 325 forwards the permission request to the security manager 315 (action "A2.Forward"). The security manager 315 verifies whether the required permission is available in the policy file 320 (action "A3.Verify"); the result of the verification (i.e., granted or denied) is returned by the security manager 315 to the wrapper 325 (action "A4.Return"). If the required permission was denied—because it was not available in the policy file 320—the wrapper 325 adds the missing permission to a log file 330 (action "A5.Add"); at the same time, the response to the permission request is forced to grant (action "A6.Grant"). The response to the permission request so obtained is then returned from the wrapper 325 to the Java application 310 (action "A7.Return"); in this way, the Java application 310 is always granted the required permission (by either the security manager 315 or the wrapper 325), so that its operation can continue without any problem. At the end of the running of the Java application 310, a comparison tool 335 adds the missing permissions (in the log file 330) to the policy file 320—so as to include all the permissions (or at least most of them) that are required for the correct operation of the Java application 310 (in the production environment).

In this way, the desired result is achieved without the need of replacing the security manager 315. Indeed, the proposed technique only requires wrapping the security manager 315 (with the wrapper 325) in the test environment—for populating the policy file 320; however, once the desired policy file 320 has been defined, the (standard) security manager 315—without the wrapper 325—can be exploited as usual.

Figure 4A:
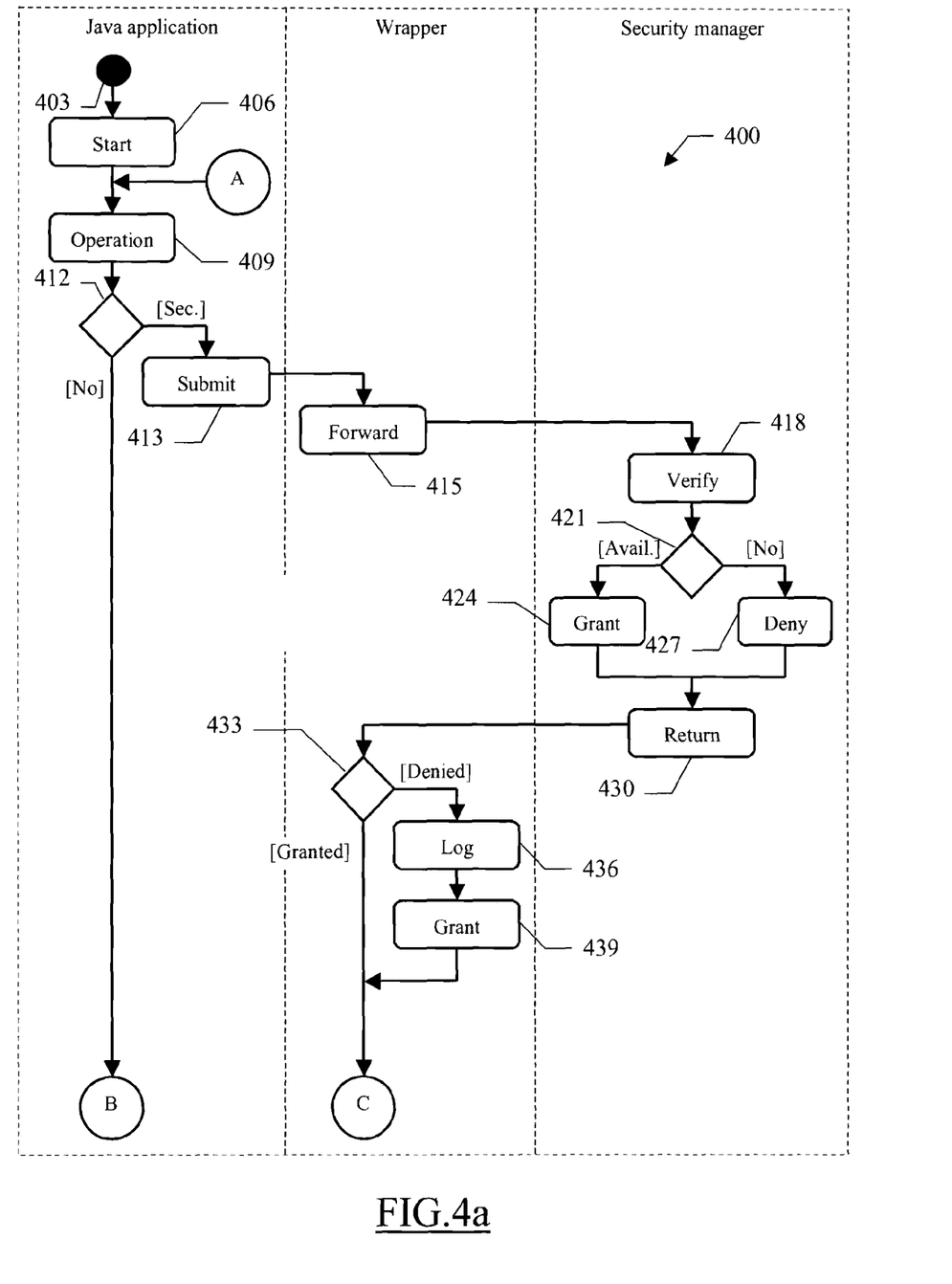
FIGS. 4a-4b show a diagram describing the flow of activities relating to an implementation of the solution according to an embodiment of the invention.
Figure 4B:
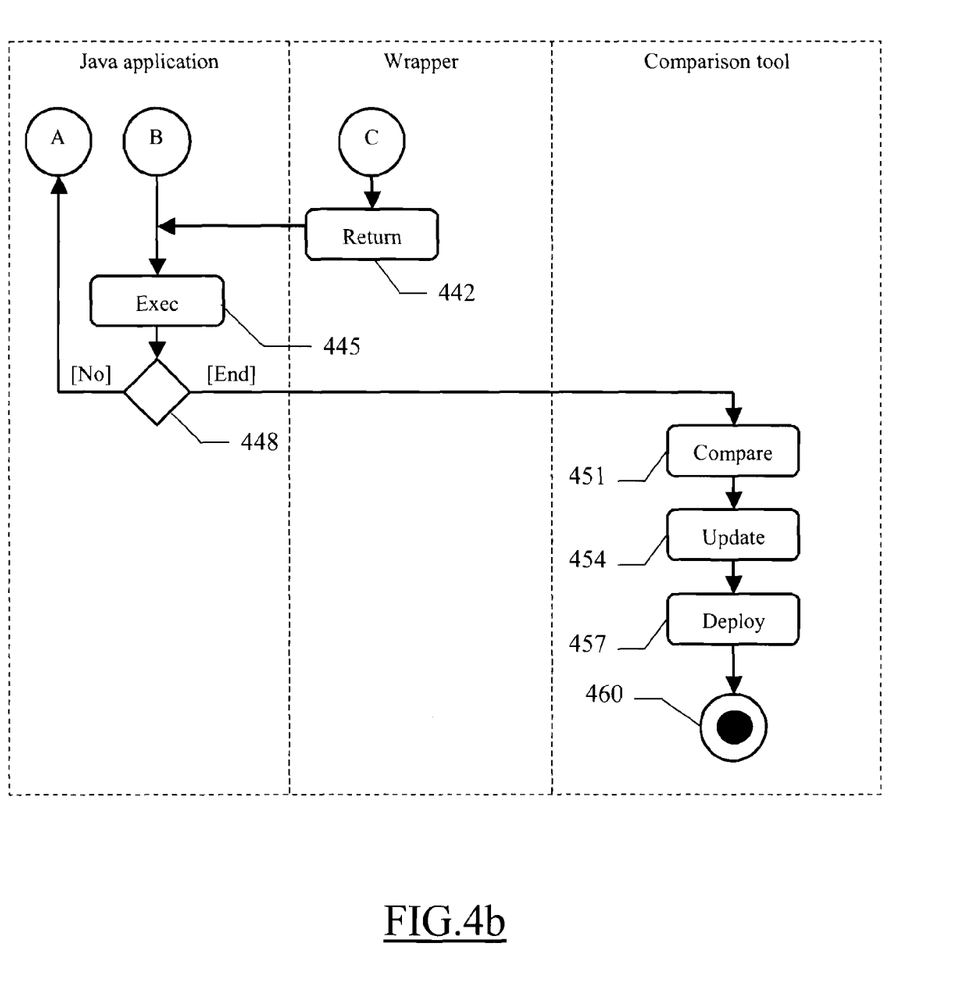

Passing to FIGS. 4a-4b, the logic flow of an exemplary process that can be implemented in the above-described system to define the policy file for a generic Java application is represented with a method 400.

The method begins at the start block 403 in the swim-lane of the Java application. Passing to block 406, the Java application is launched. In this phase, the required JVM is created and the corresponding JRE is initialized. Particularly, this involves the creation of an object of the class "Policy", which implements the control of the access to the protected resources of the server. In the solution according to an embodiment of the present invention, this object consists of the wrapper, which in turn creates the actual security manager. As usual, the security manager then reads the available permissions from the policy file (so that they remain unchanged until a reloading or an explicit refreshing thereof); at the same time, the security manager associates an object of the class "ProtectionDomain" (if it does not already exist) to each class of the Java application that is loaded, so as to couple the granted permissions to the corresponding code source—with the exception of core and trusted classes that do not need any explicit permission.

The running of the Java application continues to block 409. For each operation required by the Java application, the method then branches at block 412. If the operation invokes a Java API subjected to security constraints, the blocks 413-442 are executed, and the flow of activities then passes to block 445; on the contrary, the block 445 is reached directly (from the block 412).

Considering now block 413, when the Java application needs to execute an operation on a secured resource the corresponding permission request is submitted to the wrapper (by calling the method "getpermissions" with the required permission as an argument). The wrapper at block 415 forwards the permission request to the security manager (by calling the same method on it).

In response thereto, the security manager at block 418 verifies whether the required permission is available in the policy file (as indicated in the object associated with the corresponding code source). The process then branches at block 421 according to the result of the verification. Particularly, the security manager grants the required permission at block 424 when a grant entry for the code source coming from the location and/or signed by the signer of the Java application exists; this grant entry must in turn include a permission entry for the type of operation (with the possible indication of the action for the operation and the signer of the permission class) specified in the permission request. Conversely, the security manager denies the required permission at block 427. In both cases, the result of the verification is returned to the wrapper at block 430; particularly, the security manager thrown a normal return when the required permission is granted, whereas it thrown an exception otherwise.

Referring back to the swim-lane of the wrapper, the flow of activities branches at block 433 according to the result of the permission request. If the permission request was denied, the method proceeds to block 436; in this phase, a grant entry for the missing permission (with the specification of the source code of the Java application and the specification of the corresponding permission entry complying with the syntax of the policy file) is added to the log file. At the same time, the response to the permission request is forced to grant at block 439. The process then descends into block 442; the same point is also reached from block 433 directly when the required permission was granted. With reference now to block 442, the wrapper returns the response to the permission request so obtained (i.e., always granting the required permission) to the Java application. The desired operation (associated with the required permission) can then be executed at block 445.

A test is now made at block 448 to determine whether the running of the Java application has been completed. If not, the flow of activities returns to block 409 to execute a next operation. At the end of the running of the Java application, the process continues to block 451 in the swim-lane of the comparison tool; in this phase, the log file is compared with the policy file to determine any new code source and any new permission for preexisting code sources. The policy file is then updated accordingly at block 454; this means adding a grant entry for the permissions of any new code source that did not exist previously, and adding a permission entry in the respective grant entry for any new permission relating to a preexisting code source. The policy file so obtained can now be deployed at block 457 (for example, by a system administrator with the required authorizations) to a production environment—without any wrapper—for supporting the correct operation of the Java application. The process then ends at the concentric white/block stop circles 460.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

More specifically, it is emphasized that although the proposed solution has been described with a great emphasis on the problem of defining the permissions required for the correct operation of the software application, this must not be interpreted in a limitative manner; indeed, the same technique may also be used to add required resources (such as registry entries, files, ports, and the like), and more generally to whatever activity relating to the configuration of the software application.

Likewise, the same concepts also apply to any other operations of the software application that require specific configuration features for their executions (such as the specification of particular paths or port numbers).

Moreover, it is possible to exploit different solutions for intercepting the invocations of the operations of the software application and/or for simulating the availability of the missing configuration features (for example, by means of hooking techniques).

Of course, any other action may be performed for configuring the software application according to the result of the proposed method. For example, it is possible to update the policy file directly at run-time—possibly with its immediate refreshing.

Similar considerations apply if the permissions are defined in a different way (for example, at the level of a current user of the software application).

Alternatively, it is possible to implement any other algorithm for granting/denying the required permissions (for example, based on more complex security policies).

The concepts of the present invention are also applicable when the permissions are stored in any other security structure (such as a database).

In any case, the log file may simply provide an indication of the degree of granularity of a current security policy (to be used as a suggestion for refining the available permissions).

Even though in the preceding description reference has been made to the policy file for Java applications, this is not to be interpreted in a limitative manner; indeed, the same technique may be used to populate equivalent security structures for software applications written in any other language (or more generally for their configuration).

Nothing prevents replacing the wrapper with any other artifact suitable to provide the same results; for example, it is possible to add a dedicated user-exit to the security manager (which is enabled in the test environment and disabled in the production environment).

In any case, the application of the same solution in the production environment directly is not excluded (for example, to monitor the required permissions even after the deployment of the software application).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing system, such as external or resident software, firmware, or microcode (either in object code or in source code). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with a hardware structure (for example, integrated in a chip of semiconductor material), or with a combination of software and hardware.

Alternatively, the proposed method may be carried out on a server having a different architecture or including equivalent units (such as cache memories temporarily storing the programs or parts thereof to reduce the accesses to the mass memory during execution); likewise, the same solution may also be applied on a client, or on a stand-alone computer. More generally, it is possible to replace the computer with any code execution entity (such as a PDA, a mobile phone, and the like).

The invention claimed is:

1. A method for configuring a software application, comprising:
    running the software application on a data processing system;
    invoking a plurality of operations of the software application, the execution of each operation requiring a configuration feature of the software application;
    verifying, for each operation in the plurality of operations, an availability or a non-availability of a configuration feature required by the operation based on a data structure storing identifiers of available configuration features required by operations in the plurality of operations;
    logging an indication of each non-available configuration feature required by each operation to thereby generate logged non-available configuration features;
    simulating, for each operation, availability of each non-available configuration feature to enable execution of the operation;
    executing each operation based on the simulation of availability of each non-available configuration feature; and
    configuring the software application according to the logged non-available configuration features by updating the data structure to include the logged non-available configuration features as available configuration features required by operations in the plurality of operations.

2. The method according to claim 1, wherein each configuration feature includes an indication of a permission to execute a corresponding operation.

3. The method according to claim 2, wherein verifying comprises verifying the permission to execute each operation, wherein logging comprises, in response to a denial of a permission, logging an indication of the denied permission, and wherein simulating comprises forcing a grant of each permission in response to the denial of the permission.

4. The method according to claim 3, wherein the data structure is a security structure that stores available permissions for execution of the plurality of operations, and wherein updating the data structure comprises updating the security structure according to the logged denied permissions.

5. The method according to claim 4, wherein updating the security structure comprises:
adding the logged denied permissions to the security structure.

6. The method according to claim 4, wherein the software application is a Java application and the security structure is a policy file.

7. The method according to claim 2, wherein the permissions are granted or denied by a security module, and wherein verifying comprises:
submitting a request for verifying the permission to execute each operation to an auxiliary module wrapping the security module,
forwarding the request from the auxiliary module to the security module, and
returning a response indicative of the grant or the denial of the permission from the security module to the auxiliary module, the steps of logging and simulating being performed under the control of the auxiliary module.

8. The method according to claim 1, wherein running, submitting, verifying, logging, simulating, and configuring are executed in a test environment, the method further comprising:
deploying the configured software application in a production environment using the updated data structure.

9. A data processing system, comprising:
a processor; and
a memory coupled to the processor, wherein the memory comprises instructions which, when executed by the processor, cause the processor to:
run a software application on the data processing system;
invoke a plurality of operations of the software application, the execution of each operation requiring a configuration feature of the software application;
verify, for each operation in the plurality of operations, an availability or a non-availability of a configuration feature required by the operation based on a data structure storing identifiers of available configuration features required by operations in the plurality of operations;
log an indication of each non-available configuration feature required by each operation to thereby generate logged non-available configuration features;
simulate, for each operation, availability of each non-available configuration feature to enable execution of the operation;
execute each operation based on the simulation of availability of each non-available configuration feature; and
configure the software application according to the logged non-available configuration features by updating the data structure to include the logged non-available configuration features as available configuration features required by operations in the plurality of operations.

10. The system according to claim 9, wherein each configuration feature includes an indication of a permission to execute a corresponding operation.

11. The system according to claim 10, wherein the instructions cause the processor to verify by verifying the permission to execute each operation, wherein the instructions cause the processor to log, in response to a denial of a permission, an indication of the denied permission, and wherein the instructions cause the processor to simulate by forcing a grant of each permission in response to the denial of the permission.

12. The system according to claim 11, wherein the data structure is a security structure that stores available permissions for execution of the plurality of operations, and wherein updating the data structure comprises updating the security structure according to the logged denied permissions.

13. The system according to claim 12, wherein the instructions cause the processor to update the security structure by:
adding the logged denied permissions to the security structure.

14. The system according to claim 12, wherein the software application is a Java application and the security structure is a policy file.

15. The system according to claim 10, wherein the permissions are granted or denied by a security module, and wherein the instructions cause the processor to verify by:
submitting a request for verifying the permission to execute each operation to an auxiliary module wrapping the security module,
forwarding the request from the auxiliary module to the security module, and
returning a response indicative of the grant or the denial of the permission from the security module to the auxiliary module, the steps of logging and simulating being performed under the control of the auxiliary module.

16. The system according to claim 9, wherein the instructions cause the processor to run, submit, verify, log, simulate, and configure in a test environment, and wherein the instructions further cause the processor to:
deploy the configured software application in a production environment using the undated data structure.

17. A computer program product, in a computer readable storage medium having a computer readable program stored thereon, wherein the computer readable program, when executed by a computing device, causes the computing device to:
run a software application on a data processing system;
invoke a plurality of operations of the software application, the execution of each operation requiring a configuration feature of the software application;
verify, for each operation in the plurality of operations, an availability or a non-availability of a configuration feature required by the operation based on a data structure storing identifiers of available configuration features required by operations in the plurality of operations;
log an indication of each non-available configuration feature required by each operation to thereby generate logged non-available configuration features;
simulate, for each operation, availability of each non-available configuration feature to enable execution of the operation;
execute each operation based on the simulation of availability of each non-available configuration feature; and
configure the software application according to the logged non-available configuration features by updating the data structure to include the logged non-available configuration features as available configuration features required by operations in the plurality of operations.

18. The computer program product according to claim 17, wherein each configuration feature includes an indication of a permission to execute a corresponding operation.

19. The computer program product according to claim 18, wherein the computer readable program causes the computing device to verify by verifying the permission to execute each operation, wherein the computer readable program causes the computing device to log, in response to a denial of a permission, an indication of the denied permission, and wherein the computer readable program causes the computing device to simulate by forcing a grant of each permission in response to the denial of the permission.

20. The computer program product according to claim 19, wherein the data structure is a security structure that stores available permissions for execution of the plurality of operations, and wherein updating the data structure comprises updating the security structure according to the logged denied permissions.

21. The computer program product according to claim 20, wherein the computer readable program causes the computing device to update the security structure by:
adding the logged denied permissions to the security structure.

22. The computer program product according to claim 18, wherein the permissions are granted or denied by a security module, and wherein the computer readable program causes the computing device to verify by:
submitting a request for verifying the permission to execute each operation to an auxiliary module wrapping the security module,
forwarding the request from the auxiliary module to the security module, and
returning a response indicative of the grant or the denial of the permission from the security module to the auxiliary module, the steps of logging and simulating being performed under the control of the auxiliary module.

23. The computer program product according to claim 17, wherein the computer readable program causes the computing device to run, submit, verify, log, simulate, and configure in a test environment, and wherein the computer readable program further causes the computing device to:
deploy the configured software application in a production environment using the updated data structure.

* * * * *